US007848833B2

(12) United States Patent
Li et al.

(10) Patent No.: US 7,848,833 B2
(45) Date of Patent: Dec. 7, 2010

(54) FLEXIBLE FIXING SYSTEM FOR PRODUCT TESTING

(75) Inventors: Lei Li, Shenzhen (CN); Ping Chen, Shenzhen (CN); Zhi Cheng, Shenzhen (CN); Xue-Liang Zhai, Shenzhen (CN); Chang-Fa Sun, Shenzhen (CN); Lin-Sen Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 809 days.

(21) Appl. No.: 11/752,908

(22) Filed: May 23, 2007

(65) Prior Publication Data

US 2008/0169595 A1 Jul. 17, 2008

(30) Foreign Application Priority Data

Jan. 12, 2007 (CN) ........................ 2007 1 0072944

(51) Int. Cl.
*G05B 19/18* (2006.01)
*G06F 19/00* (2006.01)

(52) U.S. Cl. ........................................ 700/60; 700/114

(58) Field of Classification Search ................... 700/56, 700/60, 95, 109, 114; 269/53, 54.2, 54.4, 269/54.5, 292, 320, 903
See application file for complete search history.

(56) References Cited

U.S. PATENT DOCUMENTS

| | | | | |
|---|---|---|---|---|
| 4,563,824 | A * | 1/1986 | Baun | 33/568 |
| 5,570,920 | A * | 11/1996 | Crisman et al. | 294/111 |
| 6,109,840 | A * | 8/2000 | Raiteri | 408/3 |
| 6,437,296 | B1 * | 8/2002 | Choi | 219/444.1 |
| 2004/0249484 | A1 * | 12/2004 | Paillard | 700/56 |
| 2005/0126028 | A1 * | 6/2005 | Lim et al. | 33/645 |

* cited by examiner

*Primary Examiner*—Ryan A Jarrett
(74) *Attorney, Agent, or Firm*—Jeffrey T. Knapp

(57) ABSTRACT

A flexible/adjustable fixing system (100) for fixing a workpiece (40) includes an information management module (10), a plurality of driving devices (20), and a positioning device (30). The information management module receives and processes the position information of the workpiece. The driving devices electronically couple with the information management module. The positioning device includes a platform (31) and a plurality of positioning pins (32). One end of the workpiece is positioned in a certain area of the platform. Each respective pin is attached to a corresponding driving device. When the driving device receives an order/signal from the information management module, the positioning pin is selectably driven relative to (e.g., toward, away from) the workpiece by the driving device.

19 Claims, 3 Drawing Sheets

FLEXIBLE FIXING SYSTEM FOR PRODUCT TESTING

BACKGROUND OF THE INVENTION

1. Field of the Invention

The present invention relates to a fixing system for testing, particularly, to a flexible/adjustable fixing system for product testing.

2. Description of Related Art

In the electronic device manufacturing industry, it is generally necessary to test mobile phones, PDA's, and so on, so as to insure the quality thereof. Generally, in product testing, a fixture is provided to fix/hold a workpiece in place. The fixture is typically mounted on a platform of a testing apparatus (e.g., a three-dimensional testing apparatus), and the workpiece is mounted in the fixture by hand, so that the testing apparatus may effectively evaluate the workpiece. However, since the prior art fixture is specifically configured (i.e., structured and arranged) for receiving a particularly designed workpiece, the fixture has a given shape configured for holding the workpiece. Accordingly, the fixture tends be suitable for fixing a certain number of workpieces of identical shape. Yet, if many different kinds of workpieces of different shapes need testing, many different-shaped fixtures would thus be needed, under the prior art scenario provided. Furthermore, when multiple fixtures are needed, additional time would be needed to replace the fixture each time a different type of workpiece had to be held, thus reducing the efficiency of the testing process. Therefore, the cost of testing the workpiece might also be increased.

Therefore, a new fixture for product testing is desired in order to overcome the above-described problems.

SUMMARY OF THE INVENTION

In one embodiment thereof, a flexible/adjustable fixing system is used to lock/hold a workpiece in a desired position. The flexible fixing system includes an information management module, a plurality of driving devices, and a positioning device. The information management module receives and processes the position information of the workpiece. The driving devices are electronically connected/coupled with the information management module. The positioning device includes a platform and a plurality of positioning pins. One end of the workpiece is positioned in the platform at a certain/chosen location thereof. The positioning pins are respectively drivably and slidably attached within their corresponding driving devices. When the driving device receives an order/signal from the information management module to hold a workpiece in place, the positioning pin is selectably driven relative to (e.g., against) the workpiece by the driving device.

Other advantages and novel features will become more apparent from the following detailed description when taken in conjunction with the accompanying drawings.

BRIEF DESCRIPTION OF THE DRAWINGS

Many aspects of the flexible/adjustable fixing system can be better understood with reference to the following drawings. The components in the drawings are not necessarily drawn to scale, the emphasis instead being placed upon clearly illustrating the principles of the present flexible fixing system. Moreover, in the drawings, like reference numerals designate corresponding parts throughout the several views.

DETAILED DESCRIPTION OF THE INVENTION

Figure 1:
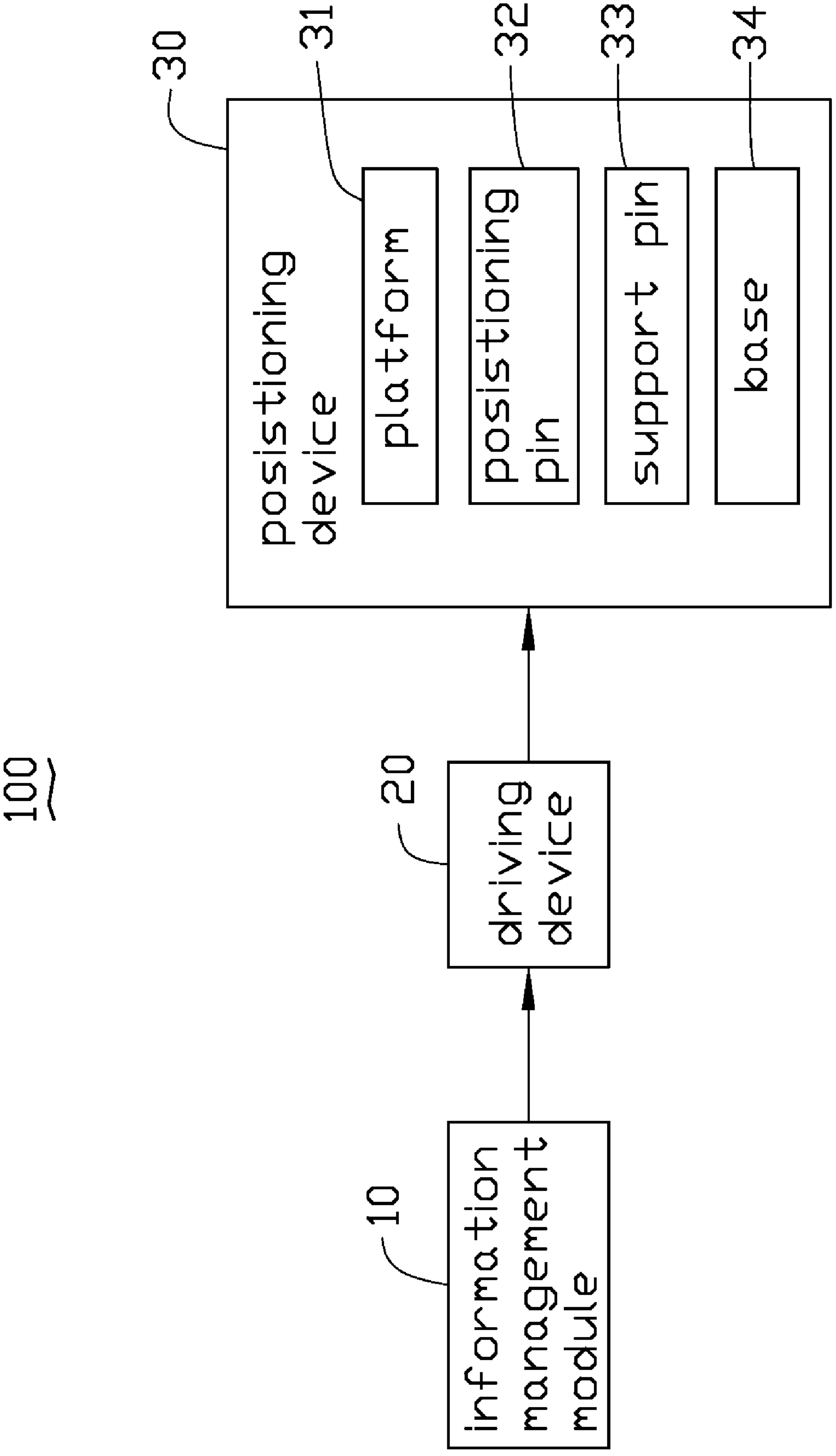
FIG. 1 is a schematic view of a flexible fixing system, in accordance with a present embodiment.

Referring now to FIG. 1, a flexible/adjustable fixing system 100 includes an information management module 10, several driving devices 20, and a positioning device 30, in accordance with a present embodiment. The flexible fixing system 100 is used to lock/hold a workpiece 40 in a desired position to facilitate, e.g., a measurement or an assembly operation.

The information management module 10 may, advantageously, be a single chip microcomputer (SCM), such as, for example, an 8052 SCM, for sake of compactness but could, instead, take the form of a mainframe, laptop, or personal computer, depending on the production environment. The information management module 10 is configured to receive and process the position information (i.e., both the desired and actual position thereof) of the workpiece 40 and to then send instructions (i.e., in the form of control signals) to the respective driving devices 20, accordingly. The information management module 10 defines the coordinates of the positioning device 30 and the workpiece 40 and gives orders/commands to the driving devices 20 based on such coordinate information. The position information of the workpiece 40 may be input into the information management module 10, e.g., manually, via, for example, a keyboard or a voice-recognition system (neither shown). Alternatively, the information management module 10 may connect with a computer (not shown) storing position information of the workpieces 40, and the computer can send corresponding position information of the workpiece 40 to the information management module 10, when needed.

Figure 2:
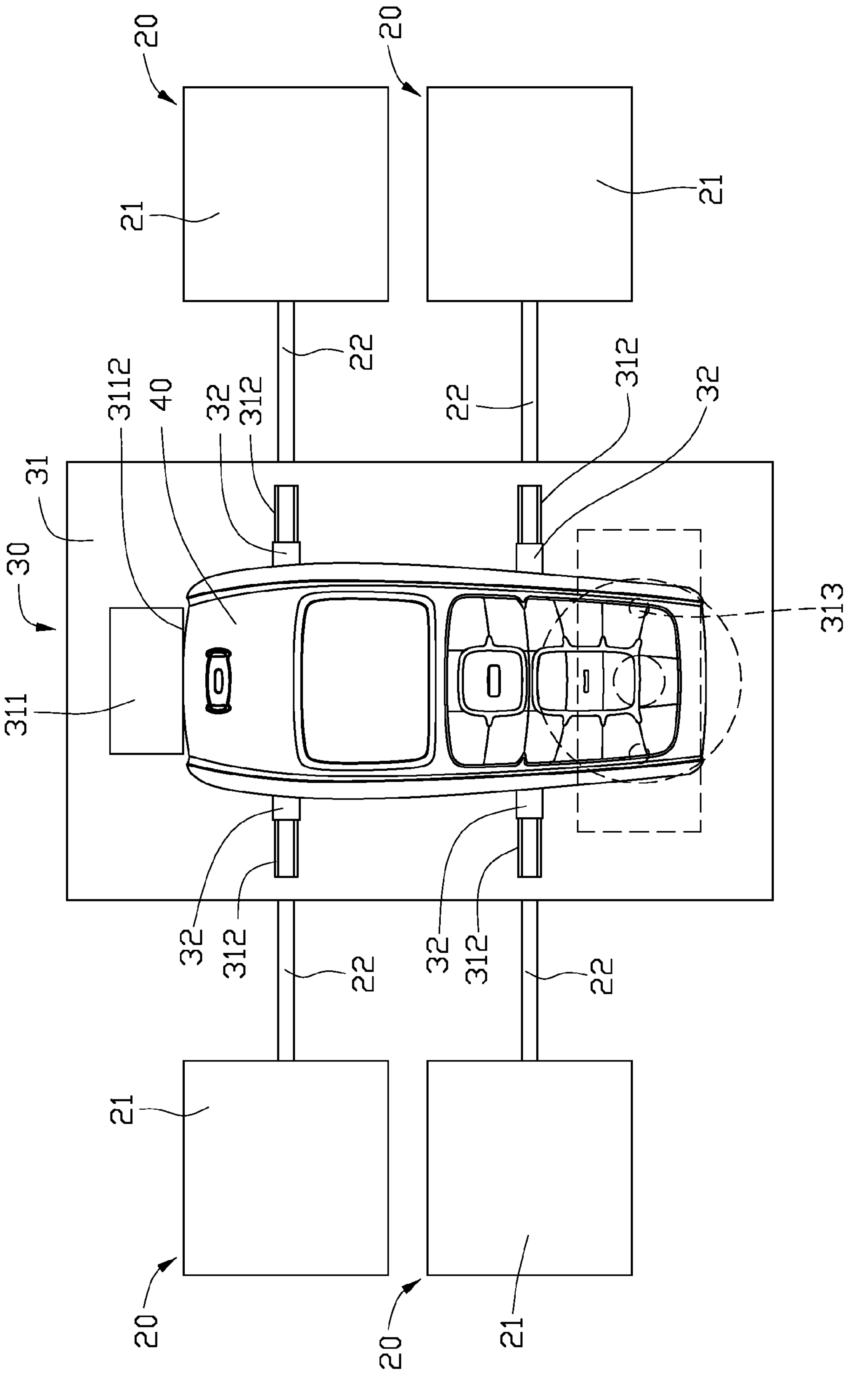
FIG. 2 is a schematic, top view of the flexible fixing system, according to FIG. 1, the fixing system displaying a workpiece fixed therein.
Figure 3:
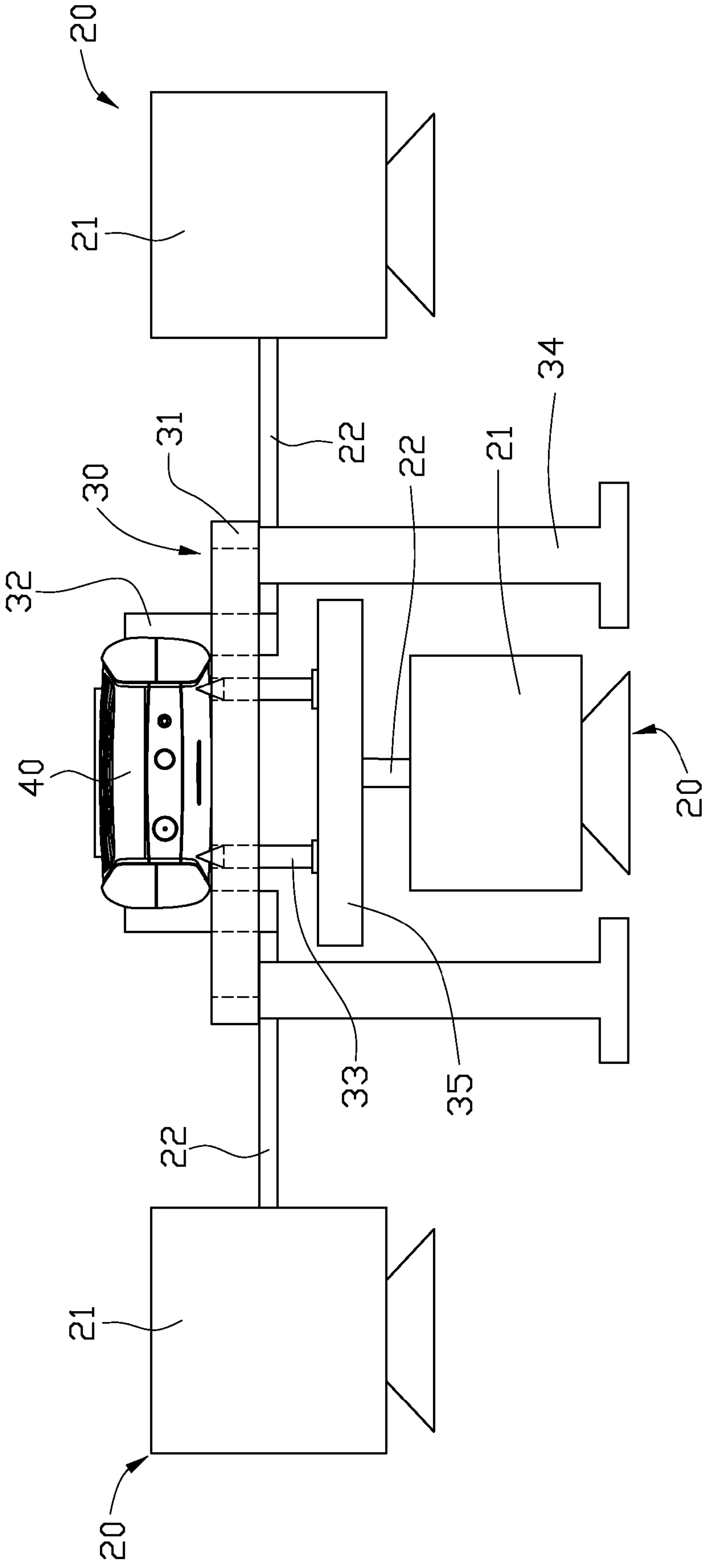
FIG. 3 is a schematic, front view of the flexible fixing system shown in FIG. 2, with the workpiece fixed therein.

Referring to FIGS. 2 and 3, the driving devices 20 electrically/electronically connect/couple (e.g., hard-wire or wireless link) with the information management module 10, so as to receive instructions from the information management module 10. Each driving device 20 includes an electromotor 21 and a transmission shaft 22 connecting with the electromotor 21. The electromotor 21 may, usefully, be a linear electromotor, which may drive the transmission shaft 22 to move in line (one of toward and away from the positioning device 30) when it receives an instruction from the information management module 10. Understandably, the electromotor 21 may, instead be a rotary electromotor, and the driving device 20 further includes a transmission screw. In that instance, one end of the transmission screw connects with the rotary electromotor, and the other end of the transmission screw connects with the transmission shaft 22. When the rotary electromotor receives an instruction from the information management module 10, the rotary electromotor drives the transmission screw to rotate, and the transmission screw transfers the rotational movement into an appropriate linear movement of the transmission shaft 22.

The positioning device 30 includes a platform 31, four positioning pins 32, two support pins 33, a base 34, and a rectangular flat board 35. The base 34 supports the platform 31. Each positioning pin 32 respectively corresponds to a driving device 20 laterally positioned relative to the positioning device 30. The two support pins 33 respectively correspond to a driving device 20 situated vertically below the positioning device 30.

The platform 31 configured for supporting a workpiece 40 may, advantageously, be a rectangular, flat board. A rectangular block 311 is formed on one end of the platform 31. The block 311 has a vertical surface 3112 configured for resisting/biasing against one end of a workpiece 40. The vertical surface 3112 is oriented perpendicular to the platform 31. Two circular through holes 313 are defined in another end of the platform 31. Each through hole 313 is configured for receiving a given support pin 33. Four linear sliding slots 312 are defined in the platform 31 between the vertical surface 3112 of the block 311 and the through holes 313. The linear sliding slots 312 are parallel with the block 311 and are symmetrically positioned at the two sides of the block 311. Each sliding slot 312 is configured for receiving a respective positioning pin 32.

The positioning pins 32 are each slidably received in their respective sliding slots 312. Each positioning pin 32 is mechanically joined/linked to a transmission shaft 22 of a corresponding driving device 20, so that the transmission shaft 22 may selectably drive the positioning pin 32 to slide along a corresponding sliding slot 312.

The support pins 33 are slidably received in the through holes 313, respectively, with one given end thereof fixed on/to the flat board 35. The flat board 35 is joined to the transmission shaft 22 of the driving device 20, so that the flat board can move in conjunction with the transmission shaft 22. Each of the support pins 33 may vertically move via the flat board 35 driven by the driving device 20. Thus, the workpiece 40 may thereby be supported and positioned along a vertical direction relative to the flat board 35.

In use, the workpiece 40 is placed on the platform 31, with one end against the vertical surface 3112 of the block 311. The user inputs positioning information to the information management module 10. The information management module 10 then gives orders (i.e., transmits control signals) to the respective electromotors 21. Each electromotor 21 drives the corresponding transmission shaft 22 to move in line. Accordingly, the positioning pins 32 move along a corresponding sliding slot 312, and the support pins 33 respectively move along a corresponding through hole 313. The positioning pins 32 and the support pins 33 respectively selectably/controllably move to a certain position relative to the workpiece 40 (e.g., moved toward/away or not moved at all), the action of the pins 32, 33 thereby permitting the workpiece 40 to be pushed into place and retained thereat. Accordingly, the workpiece 40 is positioned and locked by means of the positioning pins 32, the support pins 33, and the block 311.

It should be understood that the numbers of the positioning pins 32 and/or the support pins 33 might be changed according to the design/configuration of the workpiece 40 (e.g., the number of the positioning pins 32 and/or the support pins 33 may be increased if the shape of the workpiece 40 is complicated). The number of the driving devices 20 may be changed accordingly, as well.

It also should be understood that each of the positioning pins 32 and/or the support pins 33 might have a flexible cover, made of a material such as rubber, sponge, or the like, fixed on one end thereof, so that it may reduce the friction produced between the workpiece 40 and the positioning pin 32 or the support pin 33.

It also should be understood that instead of conventional manual localization/positioning, the flexible fixing system 100 could use the driving devices 20 to automatically drive the positioning pins 32 and/or support pins 33 to manipulate the workpiece 40. The flexible fixing system 100 locks the workpiece 40 in place in a quick and easy fashion, thus increasing testing efficiency. Furthermore, it is not necessary for the user to replace the fixture when the shape of the workpiece is changed, which reduces testing time. Accordingly, the cost of product testing is reduced.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable fixing system for holding a workpiece, comprising:

an information management module configured for receiving and processing position information of the workpiece;

a plurality of driving devices electronically coupled with the information management module; and a positioning device, including:

a platform supporting the workpiece, the platform having a stationary block fixed on one end thereof, the block contacting only a single location of the workpiece during the positioning of the workpiece by the fixing system; and a plurality of positioning pins, each respective positioning pin being attached to a corresponding driving device;

wherein the information management module transmits control signals to the respective driving devices, and each driving device thereby controllably drives a corresponding positioning pin relative to the workpiece, so that the workpiece is positioned without movement of the block.

2. The adjustable fixing system as claimed in claim 1, wherein each driving device comprises an electromotor and a transmission shaft, each transmission shaft connects with a corresponding positioning pin, and each transmission shaft is driven by the corresponding electromotor.

3. The adjustable fixing system as claimed in claim 2, wherein the electromotor is a linear electromotor.

4. The adjustable fixing system as claimed in claim 2, wherein electromotor is a rotary electromotor, the driving device further comprises a transmission screw, one end of the transmission screw is attached to the rotary electromotor, and another end of the transmission screw connects with a corresponding transmission shaft.

5. The adjustable fixing system as claimed in claim 1, wherein the platform is a flat board, a plurality of sliding slots are defined in the platform, and the positioning pins are slidably received in their respective sliding slots.

6. The adjustable fixing system as claimed in claim 5, wherein the sliding slots are parallel to the block.

7. The adjustable fixing system as claimed in claim 1, wherein the positioning device further comprises at least one support pin, the platform has at least one through hole vertically defined in another end thereof, the at least one support pin is slidably received in the through hole, and the at least one support pin is driven by a corresponding driving device.

8. The adjustable fixing system as claimed in claim 7, wherein the positioning device further comprises a flat board, the corresponding driving device comprises a transmission shaft, the flat board connects with the transmission shaft, and the at least one support pin is mounted on the flat board.

9. The adjustable fixing system as claimed in claim 7, wherein the at least one support pin has a flexible cover on an end thereof, the flexible cover being configured for reducing the friction produced between the support pin and the workpiece.

10. The adjustable fixing system as claimed in claim 1, wherein each positioning pin has a flexible cover on an end thereof, the flexible cover being configured for reducing an amount of friction produced between the positioning pin and the workpiece.

11. The adjustable fixing system as claimed in claim 1, wherein the information management module is a single chip microcomputer.

12. The adjustable fixing system as claimed in claim 1, wherein the information management module is electronically coupled with a computer, the computer storing position information regarding the workpiece, the information management module receiving the position information from the computer and providing control signals to the driving devices.

13. The adjustable fixing system as claimed in claim 1, wherein position information regarding the workpiece is manually inputted into the information management module.

14. An adjustable fixing system for holding a workpiece, comprising:

an information management module configured for receiving and processing position information of the workpiece;

a plurality of driving devices electronically coupled with the information management module; and a positioning device, including:

a platform supporting the workpiece, the platform comprising a stationary block formed on one end thereof, the block contacting only a single location of the workpiece during the positioning of the workpiece by the fixing system; and a plurality of positioning pins, each pin respectively attached to a corresponding driving device, each positioning pin being selectably driven relative to the workpiece by the driving device when the driving device receives an appropriate control signal from the information management module.

15. The adjustable fixing system as claimed in claim 14, wherein each driving device comprises an electromotor and a corresponding transmission shaft connected with the electromotor, and each positioning pin respectively connects with a corresponding transmission shaft.

16. The adjustable fixing system as claimed in claim 14, wherein the platform is a flat board with a plurality sliding slots defined therein, and the positioning pins are slidably received in the respective sliding slots.

17. The adjustable fixing system as claimed in claim 16, wherein the sliding slots are parallel to the block.

18. The adjustable fixing system as claimed in claim 14, wherein the positioning device further comprises at least one support pin, the at least one support pin corresponds to a driving device, the platform has at least one through hole vertically defined in another end thereof, and the at least one support pin is slidably received in the through hole.

19. The adjustable fixing system as claimed in claim 18, wherein the at least one support pin has a flexible cover on an end thereof, the flexible cover being configured for reducing an amount of friction produced between the support pin and the workpiece.

* * * * *